(12) United States Patent
Furutani et al.

(10) Patent No.: US 9,421,731 B2
(45) Date of Patent: Aug. 23, 2016

(54) PANEL STRUCTURE AND METHOD FOR PRODUCING THE SAME

(71) Applicant: MITSUBISHI HEAVY INDUSTRIES, LTD., Tokyo (JP)

(72) Inventors: Akira Furutani, Tokyo (JP); You Gotou, Sagamihara (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 83 days.

(21) Appl. No.: 14/379,188

(22) PCT Filed: Feb. 19, 2013

(86) PCT No.: PCT/JP2013/053950
§ 371 (c)(1),
(2) Date: Aug. 15, 2014

(87) PCT Pub. No.: WO2013/145937
PCT Pub. Date: Oct. 3, 2013

(65) Prior Publication Data
US 2015/0027514 A1    Jan. 29, 2015

(30) Foreign Application Priority Data

Mar. 28, 2012  (JP) ................. 2012-074948

(51) Int. Cl.
*B32B 3/00* (2006.01)
*B32B 3/12* (2006.01)
(Continued)

(52) U.S. Cl.
CPC ... *B32B 3/12* (2013.01); *B32B 3/30* (2013.01); *B32B 7/045* (2013.01); *B32B 7/12* (2013.01); *B32B 7/14* (2013.01); *B32B 15/043* (2013.01);
(Continued)

(58) Field of Classification Search
CPC ............. B32B 3/00; B32B 3/12; B32B 3/30; B32B 2457/12; B32B 2551/08; B32B 37/12; B32B 7/045; B32B 7/12; B32B 7/14; E04C 2002/3422; E04C 2/324; E04C 2/365; Y10T 428/24149
USPC ........................................ 428/166, 178, 180
See application file for complete search history.

(56) References Cited

U.S. PATENT DOCUMENTS

| | | | |
|---|---|---|---|
| 4,435,043 A | 3/1984 | Mertens et al. | |
| 6,200,664 B1 * | 3/2001 | Figge | B32B 3/18 102/303 |

FOREIGN PATENT DOCUMENTS

| | | |
|---|---|---|
| JP | 50-42142 Y1 | 11/1975 |
| JP | 50-160844 A | 12/1975 |

(Continued)

OTHER PUBLICATIONS

The website page of Shiroyama industry Co., Ltd. (Jul. 23, 2011), "Production engineering development for the trass core panel practical use that is high-stiffness super light weight".

(Continued)

*Primary Examiner* — Catherine A Simone
(74) *Attorney, Agent, or Firm* — Kanesaka Berner and Partners LLP

(57) ABSTRACT

A panel structure includes a plate-like flat panel and a reinforcement panel in which a criterion plate portion and a plurality of truncated conic protrusions protruding from the criterion plate portion are formed. Apex portions of the plurality of truncated conic protrusions in the reinforcement panel are joined to the flat panel by an adhesive.

16 Claims, 6 Drawing Sheets

(51) Int. Cl.
*E04C 2/32* (2006.01)
*B32B 7/04* (2006.01)
*B32B 7/12* (2006.01)
*B32B 37/24* (2006.01)
*E04C 2/36* (2006.01)
*B32B 7/14* (2006.01)
*B32B 15/04* (2006.01)
*B32B 15/08* (2006.01)
*B32B 3/30* (2006.01)
*E04C 2/34* (2006.01)
*B32B 37/12* (2006.01)
*B32B 37/00* (2006.01)
*B32B 37/14* (2006.01)

(52) U.S. Cl.
CPC ............... *B32B 15/08* (2013.01); *B32B 37/12* (2013.01); *B32B 37/24* (2013.01); *E04C 2/324* (2013.01); *E04C 2/365* (2013.01); *B32B 37/0076* (2013.01); *B32B 37/1292* (2013.01); *B32B 37/144* (2013.01); *B32B 2250/02* (2013.01); *B32B 2250/03* (2013.01); *B32B 2305/08* (2013.01); *B32B 2307/718* (2013.01); *B32B 2307/734* (2013.01); *B32B 2311/00* (2013.01); *B32B 2315/08* (2013.01); *B32B 2398/00* (2013.01); *B32B 2419/00* (2013.01); *B32B 2457/12* (2013.01); *B32B 2457/20* (2013.01); *B32B 2551/08* (2013.01); *B32B 2605/00* (2013.01); *E04C 2002/3422* (2013.01); *Y10T 428/24149* (2015.01)

(56) References Cited

FOREIGN PATENT DOCUMENTS

| | | |
|---|---|---|
| JP | 51-149450 U | 11/1976 |
| JP | 53-4947 U | 1/1978 |
| JP | 58-35359 A | 3/1983 |
| JP | 3-122413 U | 12/1991 |
| JP | 2002-182018 A | 6/2002 |
| JP | 2004-109562 A | 4/2004 |
| JP | 2004-133073 A | 4/2004 |
| JP | 2004-163803 A | 6/2004 |
| JP | 2007-112356 A | 5/2007 |
| JP | 4451366 B2 | 4/2010 |
| JP | 4707487 B2 | 6/2011 |
| JP | 4763417 B2 | 8/2011 |
| JP | 2011-194424 A | 10/2011 |

OTHER PUBLICATIONS

Written Opinion mailed May 28, 2013, corresponding to International application No. PCT/JP2013/053950.
International Search Report mailed May 28, 2013 in International Application No. PCT/JP2013/053950, filed Feb. 19, 2013.

\* cited by examiner

PANEL STRUCTURE AND METHOD FOR PRODUCING THE SAME

RELATED APPLICATIONS

The present application is a National Phase of International Application Number PCT/JP2013/053950 filed Feb. 19, 2013, which claims priority to Japanese Application Number 2012-074948 filed Mar. 28, 2012.

TECHNICAL FIELD

The present invention relates to a panel structure including a plurality of panels and a method for producing the same.

Priority is claimed on Japanese Patent Application No. 2012-074948, filed Mar. 28, 2012, the content of which is incorporated herein by reference.

BACKGROUND ART

As a panel structure including a plurality of panels, for example, a panel structure disclosed in Patent Literature 1 is described below. The panel structure includes a plate-like flat panel and a reinforcement panel in which a planar portion and a plurality of regular triangular pyramidal protrusions protruding from the planar portion are formed. The flat panel is joined to the summits of the plurality of regular triangular pyramidal protrusion portions of the reinforcement panel.

CITATION LIST

Patent Literature

[Patent Literature 1]
Japanese Patent No. 4763417

SUMMARY OF INVENTION

Technical Problem

The panel structure disclosed in Patent Literature 1 described above is an excellent structure with high rigidity and lightweight.

Here, welding can be considered as a method for joining the flat panel and the reinforcement panel. The method for joining the panels by welding ensures a high joining strength between the mutual panels, but unnecessary deformation results from the welding and each panel thus needs to be metal.

Accordingly, an object of the present invention aims to provide a panel structure and a method for producing the same capable of ensuring a high joining strength between mutual panels without being subjected to material restriction of each panel.

Solution to Problem

According to a first aspect of the present invention, a panel structure is provided, a plate-like flat panel; and a reinforcement panel in which a criterion plate portion and a plurality of truncated conic protrusions protruding from the criterion plate portion are formed. Apex portions of the plurality of truncated conic protrusions in the reinforcement panel are joined to the flat panel by an adhesive medium.

In the panel structure according to the foregoing aspect, the cross-sectional configuration of the panel structure substantially forms a trussed structure in each direction in which the flat panel extends. Thus, it is possible to achieve enhancement of rigidity and lightness of the panel structure according to the foregoing aspect.

In the panel structure according to the foregoing aspect, since the adhesive medium is used to join the flat panel to the reinforcement panel, the panel structure can be produced without being subjected to material restriction of the panels, compared with joining by welding.

Further, since predetermined areas are ensured in the portions joined to the flat panel on the side of the reinforcement panel, a high joining strength can be ensured between the mutual panels by disposing the adhesive medium in the predetermined areas. Furthermore, in the panel structure according to the foregoing aspect, since the adhesive medium is used to join the flat panel to the reinforcement panel, it is possible to avoid thermal deformation around joined portions when welding joining is performed.

According to a second aspect of the present invention, in the panel structure according to the first aspect of the present invention, the adhesive medium may be an adhesive.

In the panel structure according to the foregoing aspect, the apex portions of the plurality of truncated conic protrusions are joined to the flat panel by the adhesive based on the fact that the plurality of truncated conic protrusions are included in the reinforcement panel. Therefore, when a moisture curing type of adhesive is used as the adhesive, a contact area of the adhesive and the air increases, and thus a hardening time of the adhesive can be shortened.

According to a third aspect of the present invention, in the panel structure according to the second aspect of the present invention, the adhesive medium may be a double-sided tape.

In the panel structure according to the foregoing aspect, since the flat panel is joined to the reinforcement panel using the double-sided tape, the joining process can be performed in a short time and with ease.

According to a fourth aspect of the present invention, in the panel structure according to the second aspect of the present invention, the adhesive may include two kinds of adhesives with different elastic moduli after hardening. Of the two kinds of adhesives, one adhesive may be disposed in a plurality of first apex portions between which one or more apex portions intervene among the apex portions of the plurality of truncated conic protrusions and the other adhesive may be disposed in second apex portions other than the first apex portions.

When the flat panel and the reinforcement panel are formed of different materials and thermal expansion coefficients of both of the panels are different or a temperature is different between the flat panel and the reinforcement panel, a thermal expansion difference occurs between the panels due to a change in temperature. In the panel structure according to the foregoing aspect, by changing application positions of two kinds of adhesives with different elastic moduli after hardening, relative positional displacement between the panels caused due to the change in temperature can be caused to be considerably small in a specific spot in the panel structure while absorbing the thermal expansion difference between the path panels caused due to the change in temperature.

According to a fifth aspect of the present invention, in the panel structure according to the second or fourth aspect of the present invention, the adhesive may include two kinds of adhesives with different hardening times. Of the two kinds of adhesives, one adhesive may be disposed in a plurality of first apex portions between which one or more apex portions intervene among the apex portions of the plurality of truncated conic protrusions and the other adhesive may be disposed in second apex portions other than the first apex portions.

In the panel structure according to the foregoing aspect, the gap between the reinforcement panel and the flat panel is maintained by the hardened adhesive at the time point at which the adhesive with the short hardening time is hardened. Therefore, it is possible to cancel a force applied between the reinforcement panel and the flat panel in a direction in which the reinforcement panel and the flat panel come close to each other at this time. Accordingly, in the panel structure according to the foregoing aspect, the production time can be shortened.

According to a sixth aspect of the present invention, in the panel structure according to the fourth or fifth aspect of the present invention, the one adhesive may be an epoxy-resin-based or acrylic-resin-based adhesive.

According to a seventh aspect of the present invention, in the panel structure according to any one of the second, fourth, and sixth aspects of the present invention, the adhesive may include an elastic adhesive.

According to an eighth aspect of the present invention, in the panel structure according to any one of the fourth to sixth aspects of the present invention, of the two kinds of adhesives, the other adhesive may be an elastic adhesive.

According to a ninth aspect of the present invention, in the panel structure according to the seventh or eighth aspect of the present invention, the elastic adhesive may be a silicone-based or modified silicone-based adhesive.

According to a tenth aspect of the present invention, in the panel structure according to any one of the second, fourth, and ninth aspects of the present invention, the adhesive may be an insulating adhesive.

According to an eleventh aspect of the present invention, in the panel structure according to any one of the first to tenth aspects of the present invention, the apex portions of the truncated conic protrusions may be recessed in an opposite side to a protruding side of the truncated conic protrusions with respect to the criterion plate portion.

In the panel structure according to the foregoing aspect, the recessions of the apex portions become adhesive holes. Thus, a process of coating the adhesive on the apex portions can be easily performed. Further, in the panel structure according to the foregoing aspect, a contact area of the reinforcement panel and the adhesive also increases, thereby improving an adhering strength between the reinforcement panel and the adhesive.

According to a twelfth aspect of the present invention, in the panel structure according to any one of the first to eleventh aspects of the present invention, the truncated conic protrusions may be truncated regular triangular pyramidal protrusions.

In the panel structure according to the foregoing aspect, the rigidity of the truncated conic protrusions can be enhanced more than when the truncated conic protrusions are protrusions other than truncated regular triangular pyramidal protrusions. Therefore, the rigidity of the panel structure can be enhanced.

According to a thirteenth aspect of the present invention, in the reinforcement panel of the panel structure according to any one of the first to twelfth aspects of the present invention, a plurality of lines in which the plurality of truncated conic protrusions are arranged may be formed. Of two mutually adjacent lines among the plurality of lines, the plurality of truncated conic protrusions in one line and the plurality of truncated conic protrusions in the other line may be mutually different in positions in a direction in which the truncated conic protrusions are arranged.

In the panel structure according to the foregoing aspect, anisotropy of the reinforcement panel can be reduced and uniformity of rigidity of the portions in the panel structure can be achieved. Further, the joined portions between the flat panel and the reinforcement panel are disposed in a zigzag form. Therefore, for example, even when the flat panel receives an impact such as collision of foreign substances, it is possible to suppress cracks of the flat panel or prevent cracks from occurring. Furthermore, even when cracks occur in the flat panel, it is possible to prevent the cracks from further developing.

According to a fourteenth aspect of the present invention, in the panel structure according to any one of the first to thirteenth aspects of the present invention, three mutually contiguous truncated conic protrusions may be disposed so that the apex portions thereof are located at vertexes of an imaginary regular triangle.

Even in the panel structure according to the foregoing aspect, anisotropy of the reinforcement panel can be reduced and uniformity of rigidity of the portions in the panel structure can be achieved. Further, the joined portions between the flat panel and the reinforcement panel are disposed in a zigzag form. Therefore, even when cracks occur in the flat panel, it is possible to prevent the cracks from further developing. In this case, when the truncated conic protrusions are truncated regular triangular pyramidal protrusions, the shape of the criterion plate portion between three mutually contiguous truncated conic protrusions is a regular triangular shape. Therefore, the rigidity of the criterion plate portion can be enhanced.

According to a fifteenth aspect of the present invention, the panel structure according to any one of the first to fourteenth aspects of the present invention may further include a support beam joined to an opposite surface of the reinforcement panel to the flat panel.

In the panel structure according to the foregoing aspect, the rigidity of the panel structure can be enhanced.

According to a sixteenth aspect of the present invention, in the panel structure according to any one of the first to fifteenth aspects of the present invention, the flat panel may be warped.

According to a seventeenth aspect of the present invention, in the panel structure according to any one of the first to sixteenth aspects of the present invention, the flat panel may be a mirror of which an opposite surface to the reinforcement panel is a mirror surface.

According to an eighteenth aspect of the present invention, in the panel structure according to any one of the first to sixteenth aspects of the present invention, the flat panel may be a solar cell panel of which an opposite surface to the reinforcement panel may be a light-receiving surface.

According to a nineteenth aspect of the present invention, a method for producing a panel structure is provided. The method includes: a preparation step of preparing a plate-like flat panel and a reinforcement panel in which a criterion plate portion and a plurality of truncated conic protrusions protruding from the criterion plate portion are formed; and a joining step of disposing an adhesive medium in apex portions of the plurality of truncated conic protrusions of the reinforcement panel and joining the reinforcement panel to the flat panel.

In the production method according to the foregoing aspect, the cross-sectional configuration of the completed panel structure substantially forms a trussed structure in each direction in which the flat panel extends. Thus, it is possible to enhance the rigidity and lightness of the panel structure according to the foregoing aspect.

In the production method according to the foregoing aspect, since the adhesive is used to join the flat panel to the reinforcement panel, the panel structure can be produced without being subjected to material restriction of the panels, compared with joining by welding. Further, since predetermined areas are ensured in the portions joined to the flat panel on the side of the reinforcement panel, a high joining strength can be ensured between the mutual panels by disposing the adhesive medium in the predetermined areas. Furthermore, in the panel structure according to the foregoing aspect, since the adhesive medium is used to join the flat panel to the reinforcement panel, it is possible to avoid thermal deformation around joined portions when welding joining is performed.

Advantageous Effects of Invention

According to the foregoing aspects, it is possible to ensure a high joining strength between mutual panels without being subjected to material restriction of each panel.

DESCRIPTION OF EMBODIMENTS

Hereinafter, various embodiments of a panel structure according to the present invention will be described in detail with reference to the drawings.

"First Embodiment"

Figure 1:
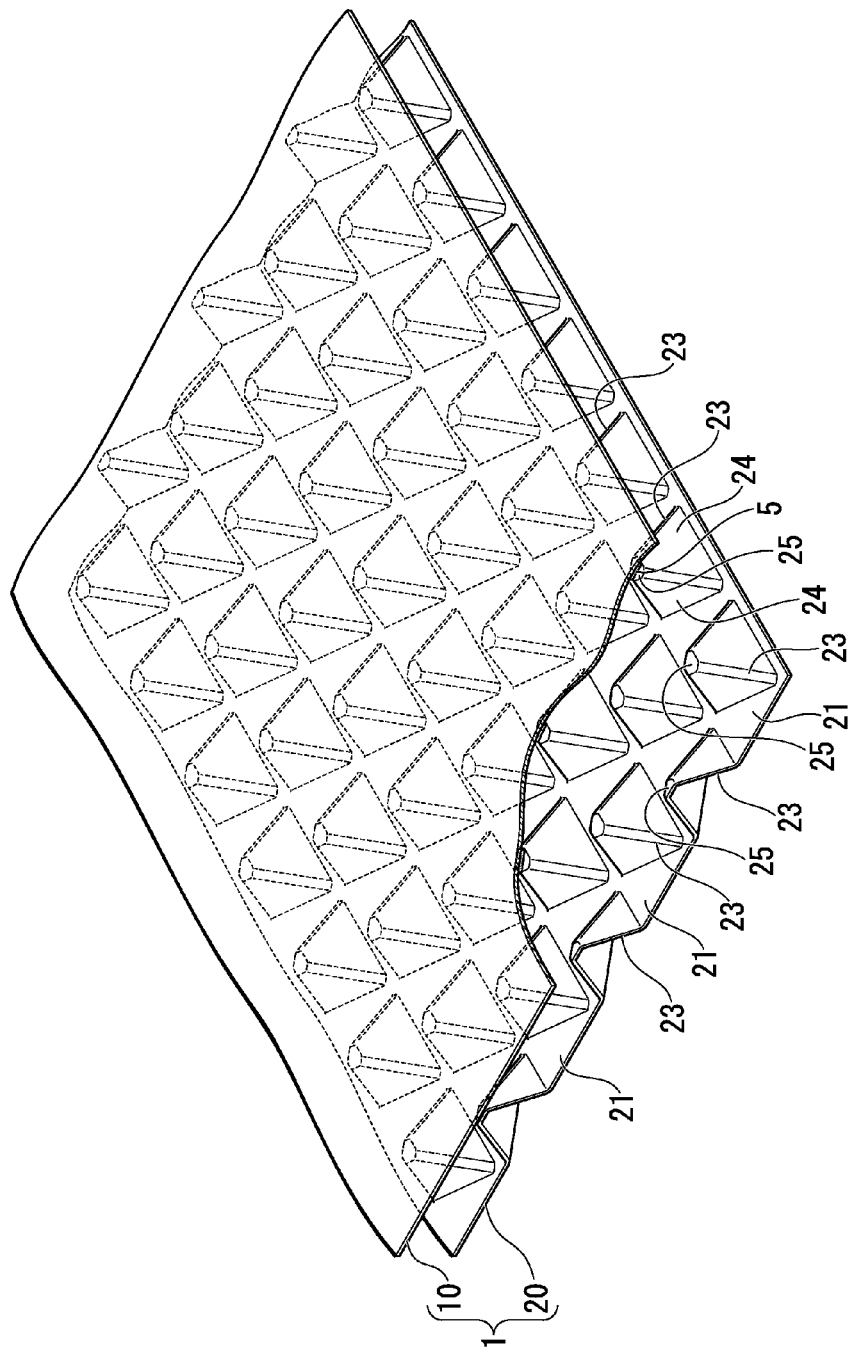
FIG. 1 is a cutout perspective view illustrating main portions of a panel structure according to a first embodiment of the present invention.

As illustrated in FIG. 1, a panel structure 1 according to an embodiment includes a plate-like flat panel 10 and a reinforcement panel 20 joined to the flat panel 10.

Figure 2:
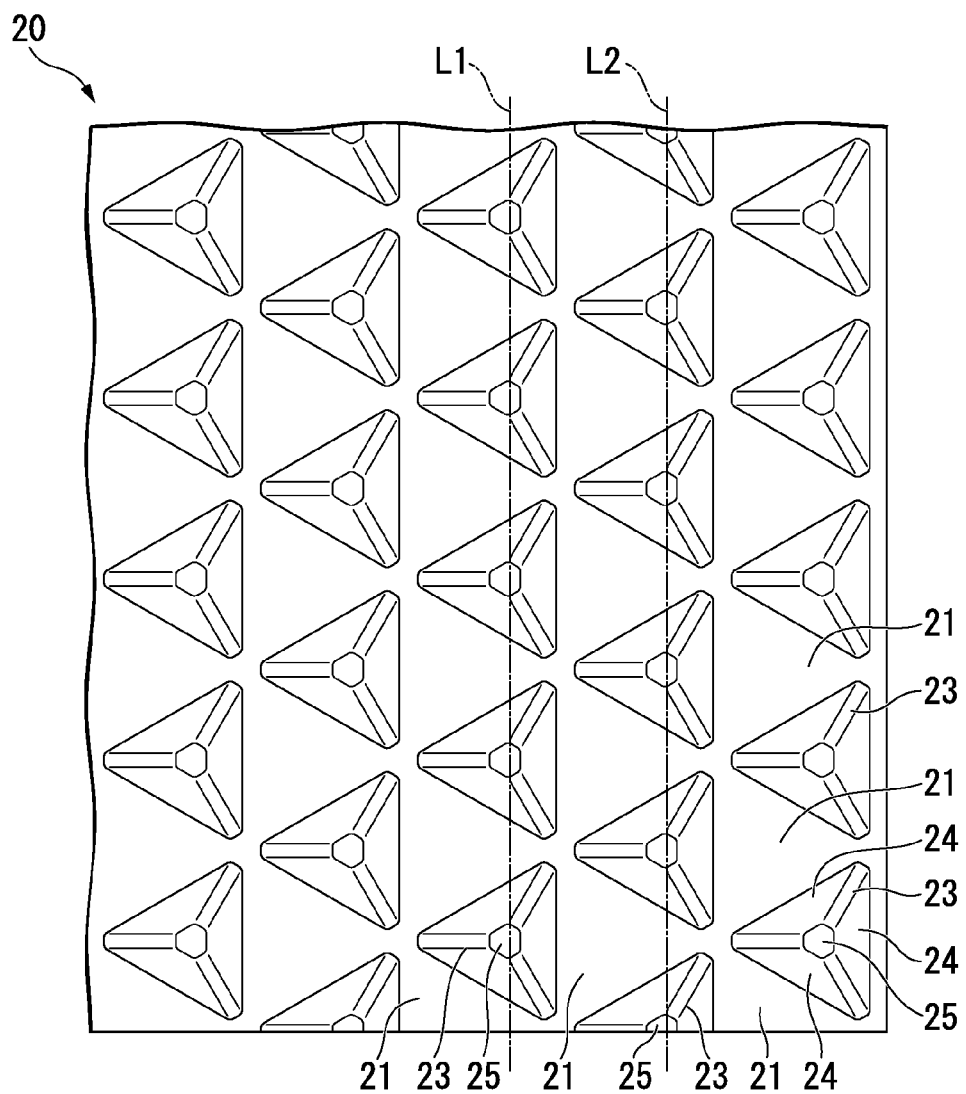
FIG. 2 is a plan view illustrating a reinforcement panel according to the first embodiment of the present invention.
Figure 3:
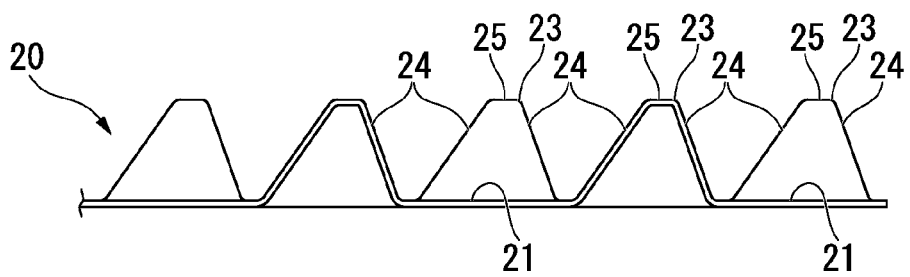
FIG. 3 is a side view illustrating the reinforcement panel according to the first embodiment of the present invention.
Figure 4:
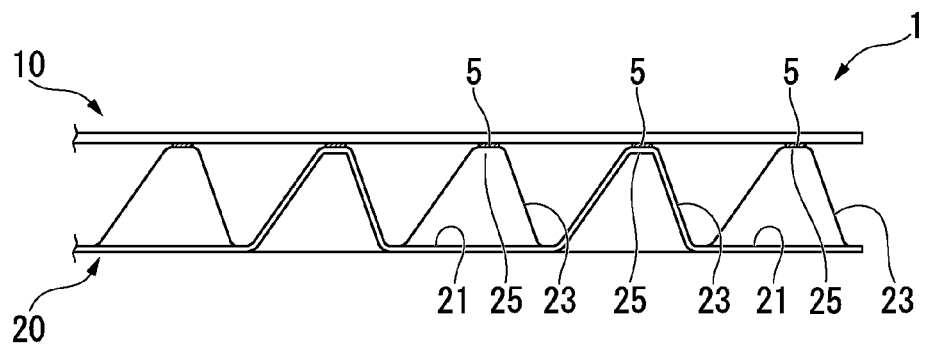
FIG. 4 is a side view illustrating the panel structure according to the first embodiment of the present invention.

In the reinforcement panel 20, as illustrated in FIGS. 1 to 3, a flat criterion plate portion 21 and a plurality of truncated conic protrusions 23 protruding from the criterion plate portion 21 are formed. The truncated conic protrusion 23 is, for example, a truncated regular triangular pyramidal protrusion which has 3 slope surfaces 24 and in which the shapes of the slope surfaces 24 are congruent. An apex portion 25 of the truncated conic protrusion 23 has a flat surface perpendicular to the height direction. In the truncated conic protrusion 23, an angle portion formed by the mutually adjacent slope surfaces 24, an angle portion formed by the slope surface 24 and the flat surface of the apex portion 25, and an angle portion formed by each slope surface 24 and the surface of the criterion plate portion 21 all have a curved shape warped gradually from one surface to the other surface.

In the reinforcement panel 20, a plurality of lines in which the plurality of truncated conic protrusions 23 are arranged are formed. As illustrated in FIG. 2, of two mutually adjacent lines L1 and L2 in the plurality of lines, the plurality of truncated conic protrusions 23 forming one line L1 and the plurality of truncated conic protrusions 23 forming the other line L2 are mutually different in positions in directions in which the truncated conic protrusions 23 are arranged. Further, the plurality of truncated conic protrusions 23 are disposed so that the apex portions 25 of three mutually contiguous truncated conic protrusions 23 are located at the vertexes of an imaginary regular triangles. Therefore, the shape of the criterion plate portion 21 located among the three mutually contiguous truncated conic protrusions 23 is also substantially a regular triangle.

Thus, since the truncated conic protrusions 23 are the truncated regular triangular pyramidal protrusions and the shape of the criterion plate portion 21 located among the three mutually contiguous truncated conic protrusions 23 is substantially a regular triangle, rigidity of the panel structure can be enhanced. Further, of the two mutually adjacent lines L1 and L2, the plurality of truncated conic protrusions 23 fanning the one line L1 and the plurality of truncated conic protrusions 23 forming the other line L2 are mutually different in positions in directions in which the truncated conic protrusions 23 are arranged. Therefore, anisotropy of the reinforcement panel 20 is small and uniformity of rigidity of the portions in the panel structure 1 can be achieved. Furthermore, the joined portions between the flat panel 10 and the reinforcement panel 20 are disposed in a zigzag form. Therefore, even when cracks occur in the flat panel 10, it is possible to prevent the cracks from further developing. Of two mutually adjacent lines L1 and L2 in the plurality of lines, the plurality of truncated conic protrusions 23 forming one line L1 and the plurality of truncated conic protrusions 23 forming the other line L2 may be mutually identical in positions in directions in which the truncated conic protrusions 23 are arranged.

The reinforcement panel 20 is formed using, for example, a metal plate such as a steel plate, an aluminum alloy plate, or a magnesium alloy plate by press molding. Also, the reinforcement panel 20 need not be a metal plate, but may be formed of a resin or a fiber-reinforced resin containing a glass fiber or a carbon fiber. When a resin is used as the material of the reinforcement panel 20, the reinforcement panel can be formed by, for example, an injection molding process of injecting a molten resin in a mold, a compression molding process of inserting a powered or granular resin into a mold and performing molding and applying pressure and heat, or a vacuum molding method for compressing a heated and softened resin sheet in a mold by vacuum suction. When a fiber-reinforced resin is used as the material of the reinforcement panel 20, the reinforcement panel can be formed by a hand lay-up method for laying a fiber aggregate in a mold and multiply stacking a resin mixed with a hardening agent while defoaming the resin. Further, when a fiber-reinforced resin is used as the material of the reinforcement panel 20, the reinforcement panel can be formed, for example, by a Sheet Molding Compound (SMC) press method for performing compression molding on a substance with a sheet shape in which an aggregate and a resin are mixed in advance in a mold, a Resin Transfer Molding (RTM) method for injecting a resin in matched molds carpeted with a fiber, or a method for performing molding by hardening a thermosetting resin by autoclave.

The flat panel 10 joined to the reinforcement panel 20 is, for example, a glass plate. The flat panel 10 may be formed of, for example, a metal such as steel or an aluminum alloy, a resin, or a fiber-reinforced resin. Also, the flat panel 10 may be a panel with various functions. For example, the flat panel 10 may be, for example, a mirror which is formed of a glass plate and of which one surface is a mirror surface, a solar cell panel, or a large-scale display panel.

Next, a method for producing the panel structure 1 according to the embodiment will be described.

First, the flat panel 10 and the reinforcement panel 20 described above are prepared (preparation step). Then, an adhesive 5 is applied to the apex portions 25 of the plurality of truncated conic protrusions 23 of the reinforcement panel 20 and the apex portions 25 of the plurality of truncated conic protrusions 23 of the reinforcement panel 20 are joined to the flat panel 10 (joining step). At this time, when the flat panel 10 is a mirror, the flat panel 10 is disposed to face the reinforcement panel 20 so that the mirror surface of the mirror is oriented toward an opposite side to the reinforcement panel 20. When the flat panel 10 is a solar cell panel, the flat panel 10 is disposed to face the reinforcement panel 20 so that a light-receiving surface of the solar cell panel is oriented toward an opposite side to the reinforcement panel 20. When the flat panel 10 is a display panel, the flat panel 10 is disposed to face the reinforcement panel 20 so that a display surface of the display panel is oriented toward an opposite side to the reinforcement panel 20. Until the adhesive 5 is hardened, a force is applied in a direction in which the reinforcement panel 20 and the flat panel 10 come close to each other. To manage the thickness of an adhesive layer, a spacer may be disposed between the reinforcement panel 20 and the flat panel 10.

Next, the adhesive 5 joining the flat panel 10 to the reinforcement panel 20 will be described.

Any type of adhesive can be basically used as long as the adhesive 5 joins the flat panel 10 to the reinforcement panel 20. However, when the flat panel 10 and the reinforcement panel 20 are formed of different materials and thermal expansion coefficients are different, an adhesive with high elasticity after hardening, in other words, an elastic adhesive with a low elastic modulus, is preferably used.

Examples of the elastic adhesive include a silicone-based adhesive or a modified silicone-based adhesive forming a rubber elastic body after hardening. Specifically, for example, an adhesive of a POS seal series made by Cemedine Co., Ltd. or an adhesive of an MP series made by Cemedine Co., Ltd. can be used. By using such an elastic adhesive, a thermal expansion difference between the panels 10 and 20 caused due to a change in temperature can be absorbed even when the thermal expansion coefficient of the flat panel 10 is different from the thermal expansion coefficient of the reinforcement panel or a use temperature is different between the flat panel and the reinforcement panel.

Figure 5:
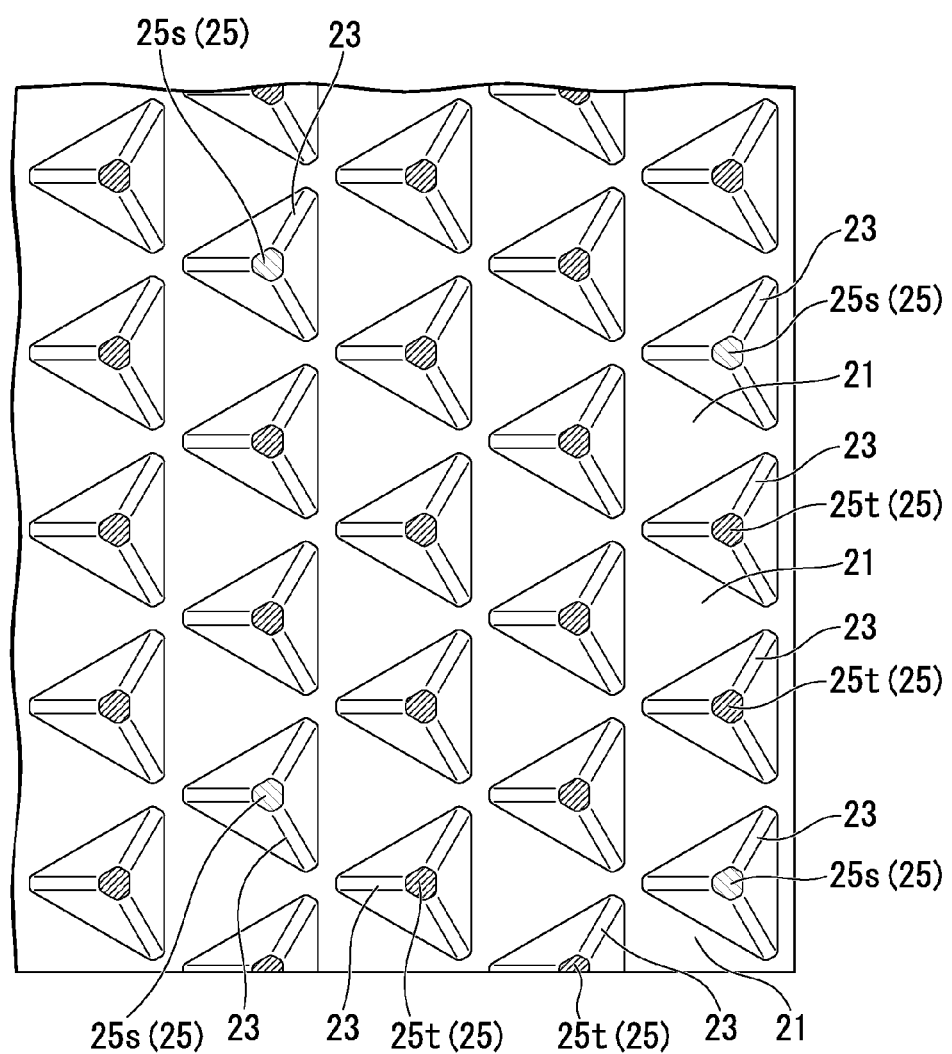
FIG. 5 is an explanatory diagram illustrating disposition of various adhesives in the panel structure according to the first embodiment of the present invention.

For the elastic adhesive, an elastic modulus or a hardening time can be changed by changing components or a component ratio of the elastic adhesive. Thus, for example, when a difference is large between the thermal expansion coefficient of the flat panel 10 and the thermal expansion coefficient of the reinforcement panel 20 or a use temperature is different between the flat panel and the reinforcement panel, an elastic adhesive with lower elastic modulus may be used. When a production time is designed to be shortened, an elastic adhesive with a short hardening time may be used. When a difference is large between the thermal expansion coefficient of the flat panel 10 and the thermal expansion coefficient of the reinforcement panel 20 and a production time is desired to be short, as illustrated in FIG. 5, an elastic adhesive with a short hardening time may be disposed in a plurality of first apex portions 25s, between which one or more apex portions 25t intervene among the apex portions 25 of the plurality of truncated conic protrusions 23 and an elastic adhesive with a long hardening time may be disposed in the second apex portions 25t, intervening between the plurality of apex portions 25s. By using two kinds of elastic adhesives of which hardening times are different in this way, the gap between the reinforcement panel 20 and the flat panel 10 is maintained by the hardened adhesive at the time point at which the adhesive with the short hardening time is hardened. Therefore, it is possible to cancel a force applied between the reinforcement panel 20 and the flat panel 10 in a direction in which the reinforcement panel 20 and the flat panel 10 come close to each other at this time. Accordingly, the production time can be shortened.

The hardening time herein may be a time during which the adhesive 5 is completely hardened, but may be a time until the adhesive 5 reaches a practical strength. The hardening time of the adhesive can be shortened by changing the components or a component ratio of the adhesive. However, when the adhesive is a moisture curing type of adhesive, the hardening time can also be shortened by managing humidity in an application environment of the adhesive.

When there are displacement suppression spots at which relative positional displacement between the panels 10 and 20 caused due to a change in temperature is desired to be considerably small in the panel structure 1 while the thermal expansion difference between the panels 10 and 20 is absorbed, an adhesive with a relatively high elastic modulus among elastic adhesives may be disposed in the apex portions 25 of the truncated conic protrusions 23 which are the closest to the displacement suppression spots and an adhesive with a relatively low elastic modulus may be disposed in the apex portions 25 of the truncated conic protrusions 23 at the other spots. For example, as illustrated in FIG. 5, an elastic adhesive with a relatively high elastic modulus may be disposed in the first apex portions 25s, and an elastic adhesive with a relatively low elastic modulus may be disposed in the second apex portions 25t.

In this case, an epoxy-resin-based adhesive or an acrylic-resin-based adhesive with an elastic modulus considerably greater than the elastic adhesive may be disposed at the apex portions 25 of the truncated conic protrusions 23 which are the closest to the foregoing displacement suppression spots, i.e., the first apex portions 25s, and an elastic adhesive may be disposed at the apex portions 25 of the other truncated conic protrusions 23, that is, the second apex portions 25t. For example, as epoxy-resin-based adhesives, there are specifically adhesives of an EP series made by Cemedine Co., Ltd. and there are more specifically EP330, EP331, and the like. For example, as acrylic-resin-based adhesives, there are specifically adhesives of a Y600 series made by Cemedine Co., Ltd. and there are more specifically Y620 and the like.

By suitably using two kinds of adhesives with different elastic moduli in this way, the thermal expansion difference between the panels 10 and 20 caused due to a change in temperature can be absorbed while partially suppressing the relative positional displacement between the panels caused due to the change in temperature in the panel structure 1. Further, when Y620 made by Cemedine Co., Ltd., which is an acrylic-resin-based adhesive, is used as an adhesive with a high elastic modulus, the hardening time of this adhesive is shorter than that of an elastic adhesive. Therefore, the production time can be shortened.

When an electric insulation property is desirable between the flat panel 10 and the reinforcement panel 20, the above-exemplified adhesives may be used due to the fact that these adhesives have an insulation property. When an electric conductive property is desirable between the flat panel 10 and the reinforcement panel 20, an adhesive containing a conductive material may be used.

In the embodiment, as described above, the cross-sectional configuration of the panel structure 1 substantially forms a trussed structure in each direction in which the flat panel 10 extends. Therefore, in the embodiment, it is possible to achieve enhancement of rigidity and lightness of the panel structure 1.

In the embodiment, since the adhesive 5 is used to join the flat panel 10 to the reinforcement panel 20, the panel structure 1 can be produced without being subjected to material restriction of the panels 10 and 20, compared with joining by welding. Further, since predetermined areas are ensured in the portions (apex portions 25) joined to the flat panel 10 on the side of the reinforcement panel 20, a high joining strength can be ensured between the mutual panels by disposing the adhesive 5 in the predetermined areas.

In the embodiment, since the adhesive 5 is used to join the flat panel 10 to the reinforcement panel 20, it is possible to avoid thermal deformation around joined portions when welding joining is performed.

"Second Embodiment"

Figure 6:
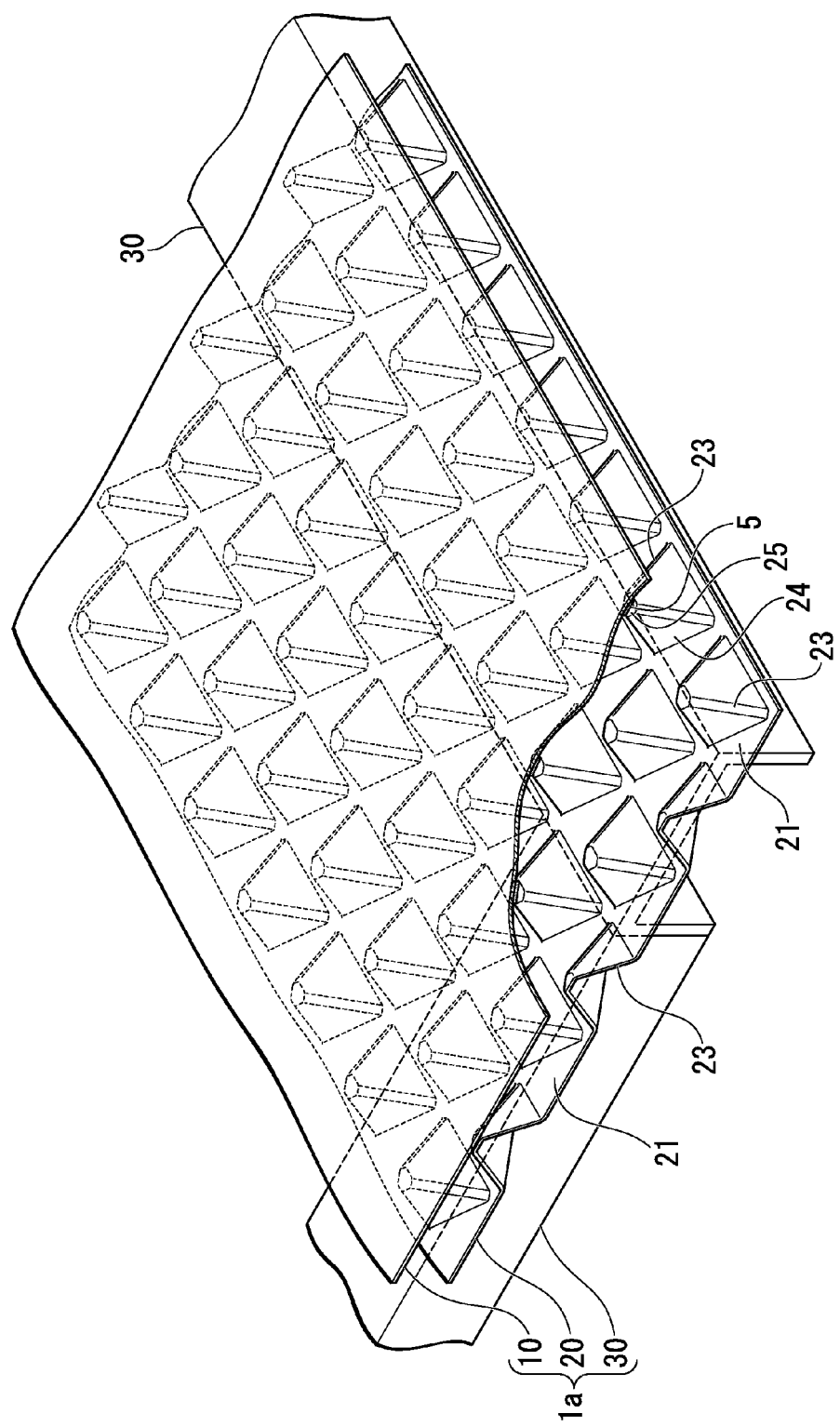
FIG. 6 is a cutout perspective view illustrating main portions of a panel structure according to a second embodiment of the present invention.
Figure 7:
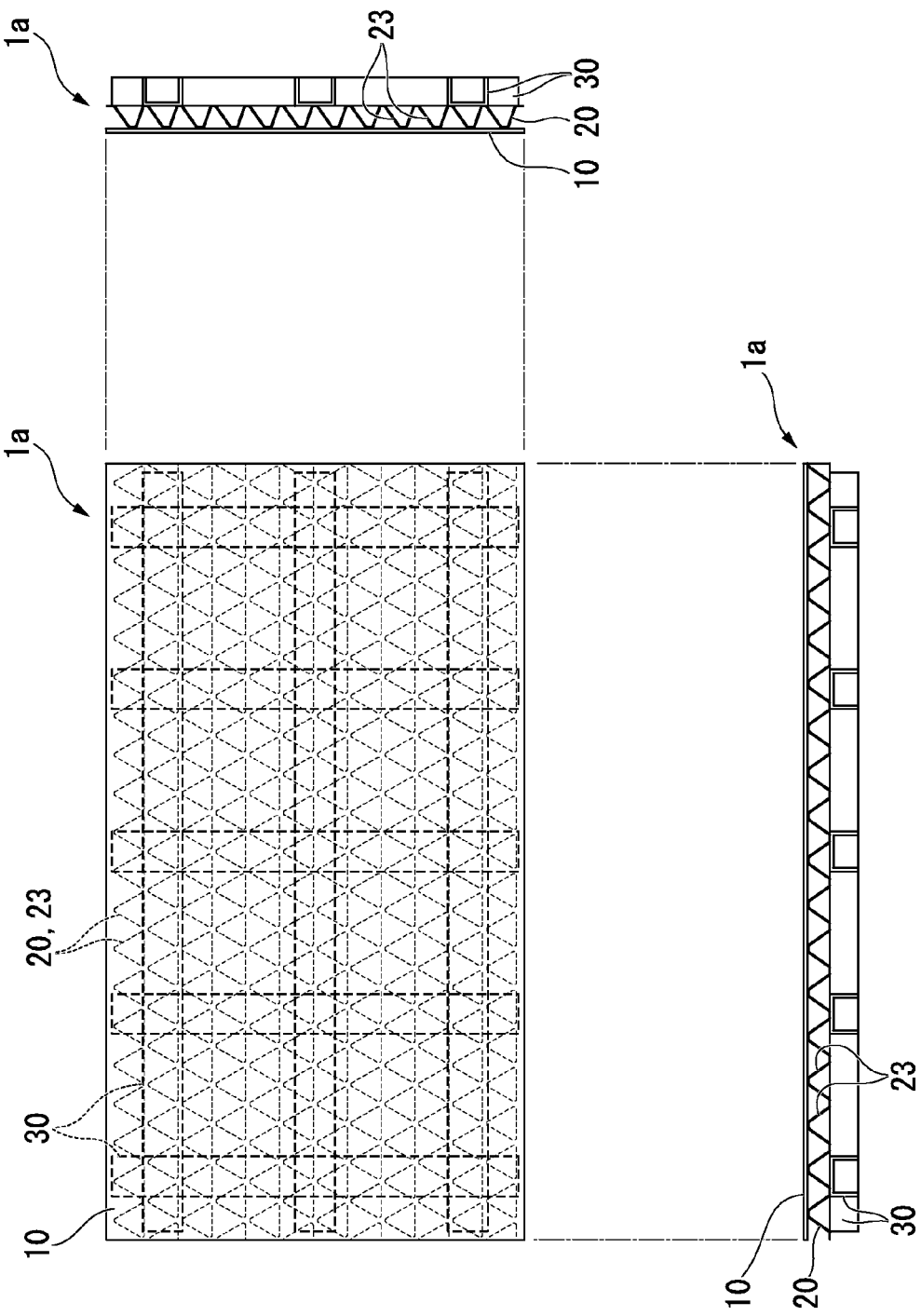
FIG. 7 is a diagram illustrating the panel structure according to the second embodiment of the present invention.

As illustrated in FIGS. 6 and 7, a panel structure 1a according to an embodiment includes a plate-like flat panel 10, and a reinforcement panel 20 joined to the flat panel 10, and a plurality of support beams 30 joined to the rear surface (which is an opposite surface to the flat panel 10) of the reinforcement panel 20.

The flat panel 10, the reinforcement panel 20, and an adhesive 5 joining both of the panels 10 and 20 are the same as those of the first embodiment. The plurality of support beams 30 are arranged in a lattice form on the rear surface of the reinforcement panel 20 and are joined to the rear surface of a criterion plate portion 21 of the reinforcement panel 20.

The support beams 30 are formed of, for example, a metal material such as steel or an aluminum alloy. Also, the support beams 30 may be formed of, for example, a resin or a fiber-reinforced resin. When the reinforcement panel 20 and the support beams 30 are formed of a metal, they may be joined by welding. When the material forming the reinforcement panel 20 and the material forming the support beams 30 are different, they may be joined by an adhesive.

The joining of the reinforcement panel 20 and the support beams 30 may be performed before the joining of the flat panel 10 and the reinforcement panel 20 or may be performed after the joining of the flat panel 10 and the reinforcement panel 20.

In the embodiment, as described above, since the support beams 30 are provided, the rigidity of the panel structure 1a can be further enhanced. The arrangement of the support beams 30 is not limited to the embodiment, and, for example, the support beams 30 may be arranged along the diagonal line of the reinforcement panel 20.

"Modification Examples"

Next, various modification examples of the panel structures 1 and 1a described above will be described.

Figure 8:
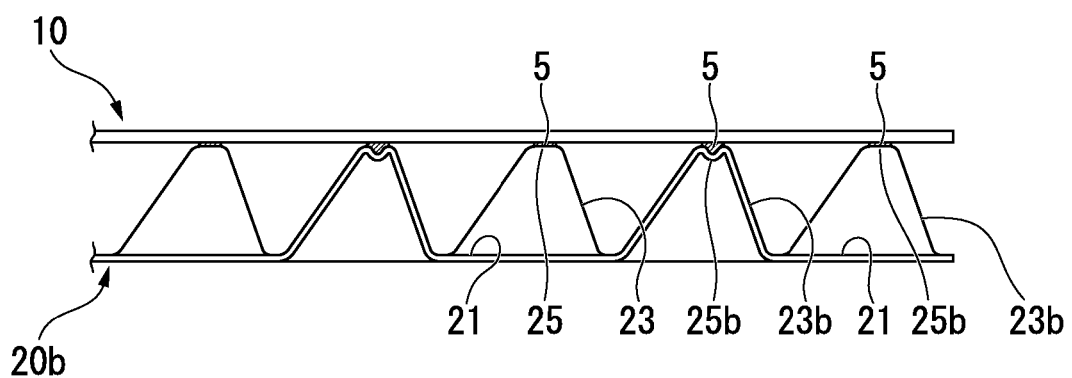
FIG. 8 is a side view illustrating a panel structure according to a modification example of each embodiment of the present invention.

The apex portions 25 of the truncated conic protrusions 23 in the reinforcement panel 20 according to each embodiment described above form planes perpendicular to the height direction. However, as illustrated in FIG. 8, apex portions 25b in a reinforcement panel 20b according to a modification example may be recessed in an opposite side to a protruding side of the truncated conic protrusions 23b with respect to the criterion plate portion 21. Thus, when the apex portions 25b can be recessed, the recessions become adhesive holes. Thus, a process of coating the adhesive 5 on the apex portions 25b can be easily performed and a contact area of the reinforcement panel 20b and the adhesive 5 also increases, thereby improving an adhering strength between the reinforcement panel 20b and the adhesive 5.

The entire surface of the flat panel 10 according to each embodiment described above is flat. However, the surface of the flat panel 10 need not be a flat surface, but may be a curved surface. That is the flat panel 10 may be warped. For example, when the flat panel 10 forms a reflection mirror or the panel structure is used as a structure material of the bodies of various vehicles such as automobiles or trains, the warped flat panel 10 may be utilized.

In each embodiment described above, the adhesive is used as an adhesive medium, but a double-sided tape may be used instead of the adhesive. In this case, an adhesive attached to both of the sides of the tape may be the adhesive exemplified above.

The panel structures 1 and 1a described above may be utilized in, for example, walls, floors, or ceilings as parts of architectures such as buildings or bridges as well as the above-described examples.

REFERENCE SIGNS LIST 1, 1a Panel structure
5 Adhesive
10 Flat panel
20, 20b Reinforcement panel
21 Criterion plate portion
23, 23b Truncated conic protrusion
24 Slope surface
25, 25b Apex portion
30 Support beam

The invention claimed is:

1. A panel structure comprising:
a plate-like flat panel; and
a reinforcement panel in which a criterion plate portion and a plurality of truncated conic protrusions protruding from the criterion plate portion are formed,
wherein apex portions of the plurality of truncated conic protrusions in the reinforcement panel are joined to the flat panel by an adhesive,
wherein the adhesive includes two kinds of adhesives with different elastic moduli after hardening, and
wherein, of the two kinds of adhesives, one adhesive is disposed in a plurality of first apex portions between which one or more apex portions intervene among the apex portions of the plurality of truncated conic protrusions and the other adhesive is disposed in second apex portions other than the first apex portions.

2. The panel structure according to claim 1,
wherein the adhesive includes two kinds of adhesives with different hardening times, and
wherein, of the two kinds of adhesives, one adhesive is disposed in a plurality of first apex portions between which one or more apex portions intervene among the apex portions of the plurality of truncated conic protrusions and the other adhesive is disposed in second apex portions other than the first apex portions.

3. The panel structure according to claim 1, wherein the one adhesive is an epoxy-resin-based or acrylic-resin-based adhesive.

4. The panel structure according to claim 1, wherein the adhesive includes an elastic adhesive.

5. The panel structure according to claim 1, wherein, of the two kinds of adhesives, the other adhesive is an elastic adhesive.

6. The panel structure according to claim 4, wherein the elastic adhesive is a silicone-based or modified silicone-based adhesive.

7. The panel structure according to claim 1, wherein the adhesive is an insulating adhesive.

8. The panel structure according to claim 1, wherein the apex portions of the truncated conic protrusions are recessed in an opposite side to a protruding side of the truncated conic protrusions with respect to the criterion plate portion.

9. The panel structure according to claim 1, wherein the truncated conic protrusions are truncated regular triangular pyramidal protrusions.

10. The panel structure according to claim 1,
wherein, in the reinforcement panel, a plurality of lines in which the plurality of truncated conic protrusions are arranged are formed, and
wherein, of two mutually adjacent lines among the plurality of lines, the plurality of truncated conic protrusions in one line and the plurality of truncated conic protrusions in the other line are mutually different in positions in a direction in which the truncated conic protrusions are arranged.

11. The panel structure according to claim 1, wherein three mutually contiguous truncated conic protrusions are disposed so that the apex portions thereof are located at vertexes of an imaginary regular triangle.

12. The panel structure according to claim 1, further comprising:
a support beam joined to an opposite surface of the reinforcement panel to the flat panel.

13. The panel structure according to claim 1, wherein the flat panel is warped.

14. The panel structure according to claim 1, wherein the flat panel is a mirror of which an opposite surface to the reinforcement panel is a mirror surface.

15. The panel structure according to claim 1, wherein the flat panel is a solar cell panel of which an opposite surface to the reinforcement panel is a light-receiving surface.

16. A method for producing a panel structure, comprising:
a preparation step of preparing a plate-like flat panel and a reinforcement panel in which a criterion plate portion and a plurality of truncated conic protrusions protruding from the criterion plate portion are formed; and
a joining step of disposing an adhesive in apex portions of the plurality of truncated conic protrusions of the reinforcement panel and joining the reinforcement panel to the flat panel,
wherein the adhesive includes two kinds of adhesives with different elastic moduli after hardening, and
wherein, of the two kinds of adhesives, one adhesive is disposed in a plurality of first apex portions between which one or more apex portions intervene among the apex portions of the plurality of truncated conic protrusions and the other adhesive is disposed in second apex portions other than the first apex portions.

* * * * *